United States Patent [19]

Engler

[11] 4,033,053
[45] July 5, 1977

[54] DIGITAL SEGMENT DISPLAY TO BRAILLE CONVERTER

[76] Inventor: Theodore T. Engler, Rte. No. 3, Box 305-B, Perry, Fla. 32347

[22] Filed: Jan. 14, 1976

[21] Appl. No.: 648,991

[52] U.S. Cl. .............................. 35/35 A; 340/407
[51] Int. Cl.² ...................................... G09B 21/00
[58] Field of Search .................. 35/35 A; 340/407; 178/DIG. 32

[56] References Cited

UNITED STATES PATENTS

| | | | |
|---|---|---|---|
| 2,907,833 | 10/1959 | Mauch | 35/35 A |
| 3,045,364 | 7/1962 | Surber | 35/35 A |
| 3,175,038 | 3/1965 | Mauch | 35/35 A X |
| 3,229,387 | 1/1966 | Linvill | 35/35 A |
| 3,230,644 | 1/1966 | Irazoqui | 35/35 A |
| 3,289,327 | 12/1966 | Chevillon | 35/35 A |
| 3,594,787 | 7/1971 | Ickes | 35/35 A X |
| 3,932,869 | 1/1966 | Kane | 35/35 A X |

OTHER PUBLICATIONS

IBM Technical Disclosure Bulletin, vol. 17, No. 8, Jan. 1975, pp. 2471–2472.

*Primary Examiner*—William H. Grieb
*Attorney, Agent, or Firm*—Dowell & Dowell

[57] ABSTRACT

A converter having an electro-optical sensing head for viewing an alpha-numeric light emitting display, generally of the type having multiple segments selectively energized to display different characters, the converter including decoder means for accepting from the head information as to which segments are illuminated and delivering an output signal representing the character presently being displayed, the converter having a Braille presentation including dot and bar means which can be raised to represent said character but in Braille form, and the converter including electrical circuit means operative in response to one of said output signals to actuate appropriate dot and bar means in the Braille presentation.

6 Claims, 5 Drawing Figures

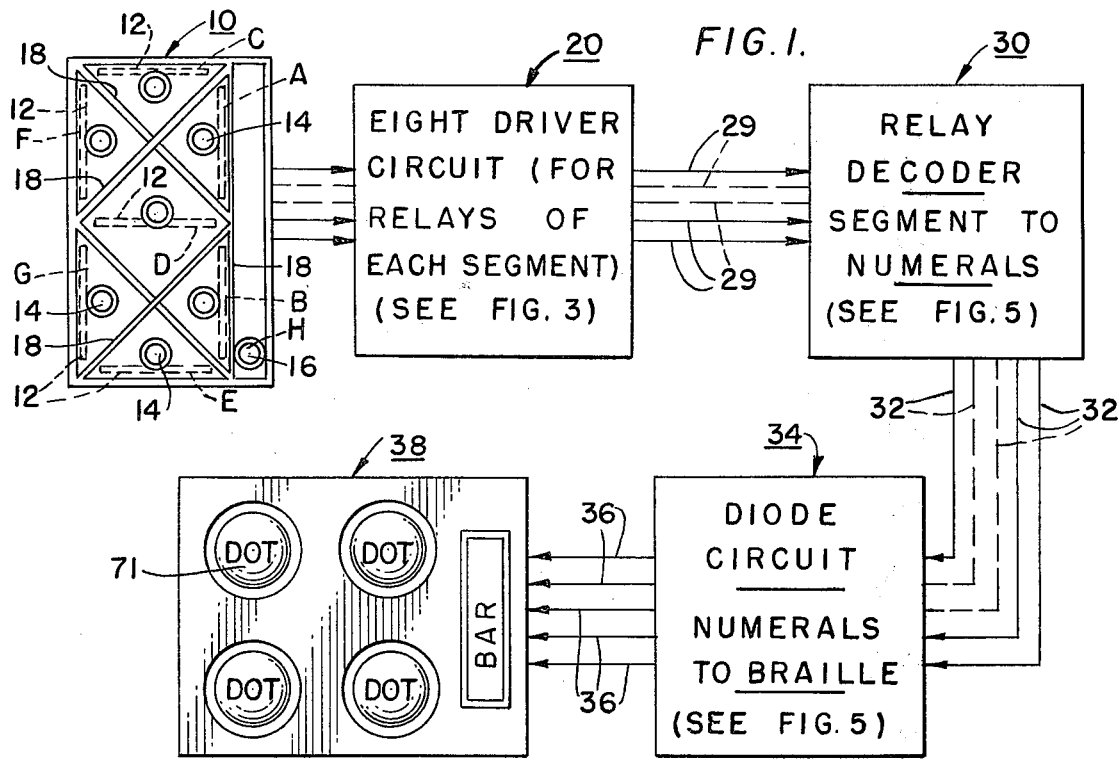
FIG. 1.
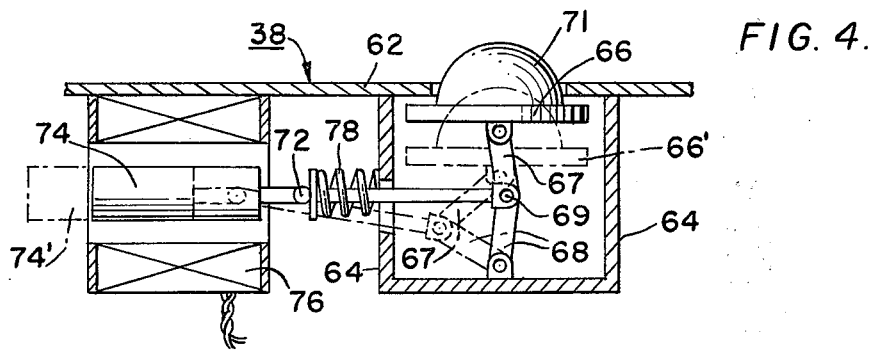
FIG. 4.
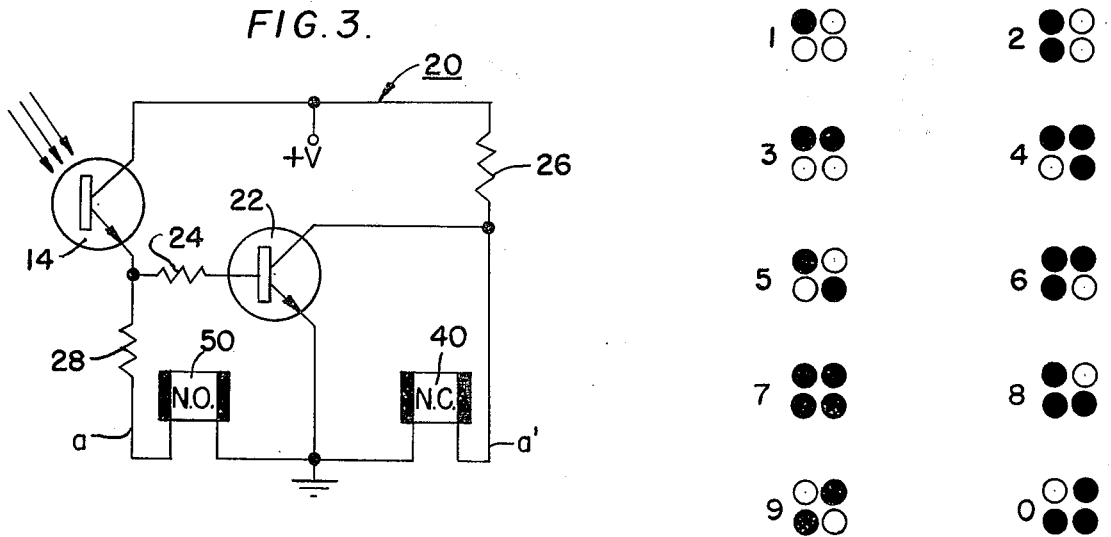
FIG. 3.
FIG. 2.

DIGITAL SEGMENT DISPLAY TO BRAILLE CONVERTER

FIELD OF INVENTION

This invention relates to apparatus for reading digital character displays having light emitting segments representing numerals and/or letters and symbols and converting such displays to standard Braille form readable as tactile presentations by a blind person.

BACKGROUND AND PRIOR ART

The appearance in common use of electronic computer and calculator equipment, which has greatly expanded the intellectual capabilities of persons having normal sight, has further disadvantaged blind persons who depend upon tactile communication, for instance, Braille presentations, because display read-outs are generally in the form of multiple-segment digital displays presenting characters in alpha-numeric light-emitting visual form. It is therefore highly desirable that blind persons have available to them relative inexpensive converters for accepting such visual displays and converting them to suitable tactile presentation, such as raised dot and bar Braille, or other appropriate tactile form.

U.S. Pat. No. 3,175,038 to Mauch shows apparatus having a photoelectric optical sytem for scanning and identifying alpha-numerics by analyzing each printed numeral or letter using a mask carrying an array of light responsive sensors designed to respond to that particular type style or font. This apparatus delivers one of a number of pre-recorded sounds in response to identified print.

U.S. Pat. No. 3,045,364 to Surber reads currency denominations photoelectrically and delivers an ouput to a blind person by raising one of several solenoid actuated plungers representing the various possible denominations.

U.S. Pat. No. 3,594,787 to Ickes has an optical scene-viewing head coupled to a rectangular grid of tactile indicators and operative to actuate certain ones thereof to provide a raised outline of the scene or object being viewed which can be read in a tactile manner by a blind person. U.S. Pat. No. 3,229,387 to Linvill is of the same general type as the Ickes patent last mentioned. None of these patents translates alpha-numeric displays into a Braille presentation, nor shows circuitry similar to that disclosed herein.

THE INVENTION

The invention comprises apparatus including an optical reading head having photoelectric sensors arranged to read an alpha-numeric display with which it is intended to cooperate. In the illustrative embodiment the display comprises a standard seven segment display having a decimal point segment also, although the reading of various other types of alpha-numeric displays is considered to be within the scope of the invention. A lens may be interposed in front of the head to focus the image and/or to adapt the head to read segment displays of different sizes, such a concept being suggested in Mauch U.S. Pat. No. 3,175,038 (supra). The outputs of the individual segment-reading light responsive means are coupled through transistor drivers to operate a bank of associated relays which decode the illuminated segments into individual outputs, each of which represents one decoded alpha-numeric character or decimal point position. A diode matrix circuit is coupled to receive these outputs and convert them to a combination of signals connected to energize a solenoid operated Braille presentation of the alpha-numeric character read by the head.

OBJECTS

It is the principal object of this invention to provide a practical converter for use by a blind person to convert an alpha-numeric display to a Braille presentation.

Another major object is to provide such a converter which can be used with "pocket" and "desk" type calculators, and which can be easily adapted to interface with the various sizes and styles of digital readouts commonly found in such calculators.

Still a further object of the invention is to provide a converter having a sensor head which reads the segments of a standard segment-type display and delivers indications of illuminated segments to a decoder circuit which has a number of different output terminals one of which provides an output to indicate which of the possible alpha-numeric characters is being displayed and read by the head. This output is then coupled by a diode matrix to provide a combination of signals to drive solenoid actuators which selectively raise a pattern of Braille dots representing the alpha-numeric character which is being read.

Another object of the invention is to provide a converter having optical sensor head means which may comprise either a single head to be scanned manually across the calculator readout, or may comprise a group of adjacent heads disposed side-by-side to read multiple digits of the calculator simultaneously without requiring manual scanning of the head means across the display thereof.

Other objects and advantages of the invention will appear during the following discussion of the drawings, wherein:

THE DRAWINGS

FIG. 1 is a block diagram showing a reading head adapted to read a standard seven-segment display with decimal point, and a cluster of Braille dots and a bar, the dots being raiseable to provide presentations of different numerals, and the bar being raiseable to provide a decimal point presentation, and the head and Braille presentation being coupled to drive the Braille presentation through a decoder which decodes the optical segments into the numerals which they represent, and a diode circuit which encodes combinations of signals suitable to energize a pattern of Braille presentation solenoids;

FIG. 2 is a table showing Braille dot arrangements for presenting the numerals 0 through 9 inclusive;

FIG. 3 is a phototransistor driver circuit for driving the relays in the decoder;

FIG. 4 is an elevation view, partly in section showing a solenoid actuator for raising and lowering a Braille dot and/or bar in the Braille presentation.

Figure 5:
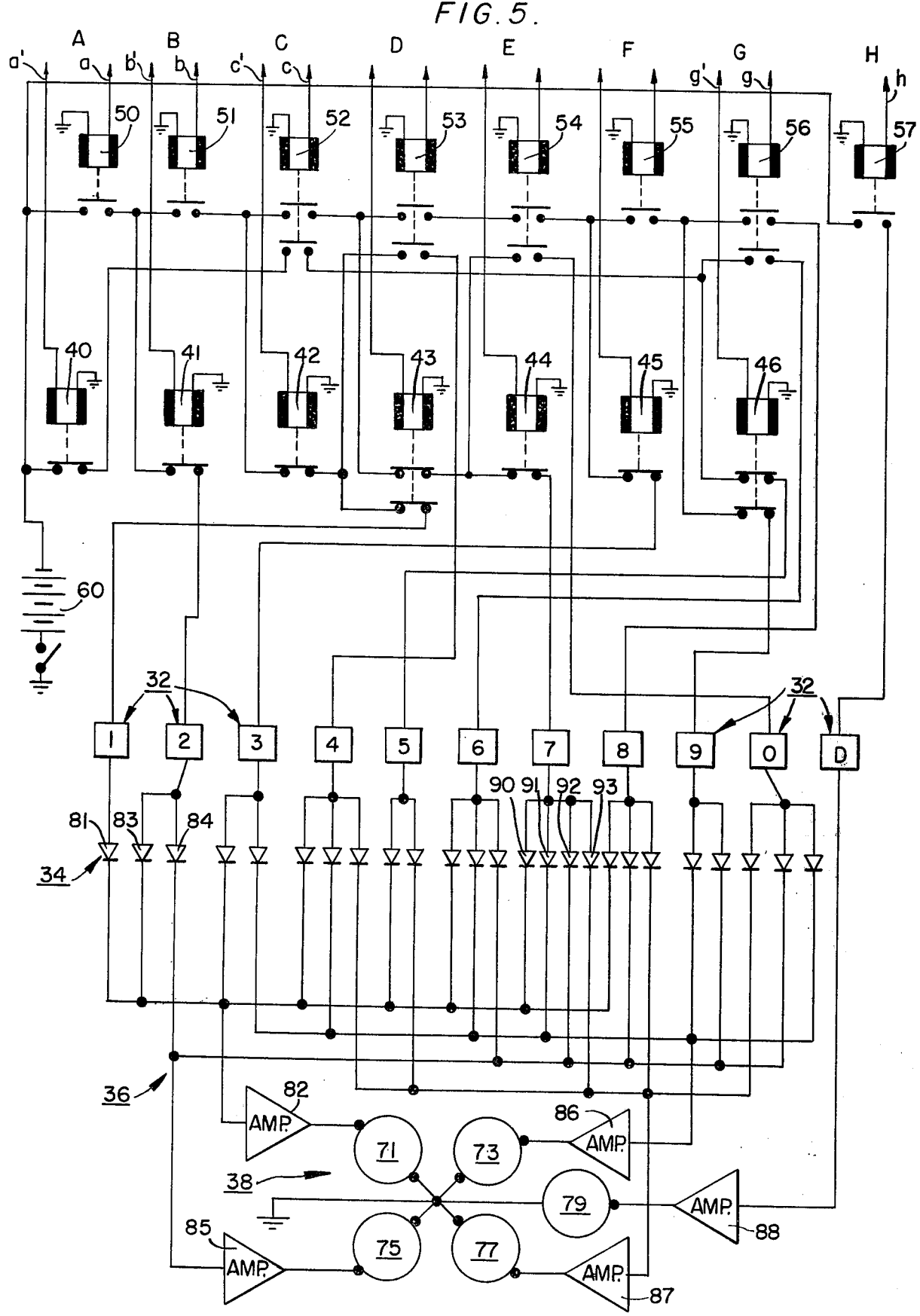
FIG. 5 is a circuit diagram showing a suitable relay decoder and a diode circuit for receiving segment information and converting it into output signal combinations for energizing the Braille presentation solenoids.

Referring now to FIG. 1, the converter comprises a reading head 10 operative to view and read the segment of a standard light emitting segment display, such segments being represented in FIG. 1 as dotted lines 12 outlined within the read head 10. The reading head includes a number of light responsive means comprising individual phototransistors 14 used for reading the respective segments 12, and including an additional light responsive means 16 for reading a decimal point. In order to reduce undesired interaction of light from the various segments 12 upon the various individual light responsive means 14, the reading head 10 is provided with barriers 18 serving to separate the light responsive means 14 into separate compartments opening toward the segments 12 of the light emitting display, but blocking light from a single segment from passing to more than one of the light responsive means 14 and 16. The eight light responsive means labelled 14 and 16 are individually coupled through driver circuits 20, one of which is shown in FIG. 3, to eight separate inputs 29 into the electrical decoder means 30. The decoder means 30 is illustrated in the upper portion of FIG. 5 in greater detail and will be explained hereinafter. The decoder 30 has a number of separate outputs 32 each representing one of the possible alpha-numeric characters which can be formed by the particular multiple-segment display 12 which the system is adapted to read. In the present example, these outputs 32 represent the numerals 0 through 9 inclusive and the decimal point, all of these outputs being generally referred to in FIG. 5 also by the reference numeral 32. The outputs 1, 2, 3, 4, . . . 9, 0 and D appear in rectangular boxes located approximately across the center of FIG. 5. Thus, the electrical decoder means 30 comprising the upper portion of FIG. 5 deliver, one at a time, an output designated 32 in the drawings, i.e., one such output for each of the alpha-numeric digits which can be represented by the multiple segment light emitting display which is being read by the converter, and which is represented in FIG. 1 by the dashed segments 12. These outputs are delivered to diode circuit means broadly referred to by the reference character 34 in FIGS. 1 and 5, the reference numeral 34 representing the circuitry appearing in the lower half of FIG. 5. The output of the diode circuitry 34 comprises in the present illustrative embodiment combinations of five possible actuator signals on the wires labelled 26, respectively connected to drive the actuator means for raising and lowering the dot and bar Braille presentation 38, which in FIG. 1 shows four dots and one bar as will be presently described. The Braille pattern presentation is generally referred to in FIGS. 1, 4 and 5 by the reference numeral 38.

Referring now to FIG. 2, this figure shows the standard Braille representations for each of the numerals 0 through 9 inclusive. In each of the patterns of four dots the darkened dot is considered raised for tactile encounter by the reader's finger, whereas the dots in the patterns of FIG. 2 which are represented by a circle are considered to be lowered and therefore out of tactile encounter by the blind person. This is a standard Braille presentation.

FIG. 3 shows one typical driver circuit 20 of which seven are required for the seven segments of the display, each of these circuits being connected to one of the photo-transistors, of which the photo-transistor 14 shown in FIG. 3 is typical. The circuit is connected to a source of voltage labelled +V, and each driver circuit further includes a transistor 22 having its collector connected with the source of voltage +V and having its emitter connected to ground. When the photo-transistor 14 is dark and not responding to illumination, the circuit through the photo-transistor is substantially open. Accordingly, no forward bias is placed upon the base of the transistor 22 through the resistor 24, and therefore the transistor 22 is also nonconductive. As a result, current from the source of voltage + V flows through the resistor 26 and through the winding of the relay 40, whereby the relay is normally closed.

On the other hand, when the photo-transistor 14 in FIG. 3 is conductive, current flows through the phototransistor 14, through the resistor 28, and through the winding of the relay 50 so that this relay is energized and closes. Moreover, when the photo-transistor 14 is conductive, the transistor 22 is strongly biased in the forward direction through resistor 24, whereby it draws current through the resistor 26 to ground thereby shunting the winding of the relay 40 and dropping the voltage across it so that the relay 40 opens. Thus, when the photo-transistor 14 is not illuminated by the segment 12 of the display which it faces, the relay 40 is closed and the relay 50 is open, but when the photo-transistor 14 is illuminated, the relays reverse, opening the relay 40 and closing the relay 50. As mentioned above, the driver circuit shown in FIG. 3 is typical of seven driver circuits all driving different relays shown in FIG. 5 and labelled 40 through 46 inclusive, and 50 through 56 inclusive.

In FIG. 5 the relays 40 through 45 inclusive, and 50 through 57 inclusive, are all shown in their normal positions which occur when the associated light emitting diodes are not energized. It will be noted that the letters A, B, C, D, E, F, G, and H appear above relays which are located directly below them, and these letters correspond with the letters A through H inclusive designating the seven segments 12 and the decimal point located opposite the eight light responsive means shown in the reading head 10 in FIG. 1. Each one of the light responsive means 14 in FIG. 1 operates both relays located beneath the corresponding letters A through G as shown across the top of FIG. 5. When one of the light responsive means 14 is illuminated, the switch positions of both relays in FIG. 5 located directly beneath the same letter A through G reverse from the positions shown in FIG. 5. In the case of the light responsive means 16 designated by the letter H, this light responsive means merely senses whether or not the decimal point is illuminated, and a single relay 57 is responsive to illumination of that diode to deliver an output to the rectangular box 32 located to the right of the center in FIG. 5 to activate an output labelled D when the decimal point in that digit is illuminated.

The two wires extending upwardly and labelled $a'$–$a$ at the top of FIG. 5 correspond with the wires $a$–$a'$ appearing in FIG. 3. Similar driver circuits to those shown in FIG. 3 are connected to the wires $b'$–$b$, $c'$–$c$ . . . through $g'$–$g$ appearing at the top of FIG. 5. The contacts associated with the various relays 40 through 46, and 50 through 57, are energized by a source of power represented by the battery 60 in FIG. 5. The battery 60 is connected to the left contact terminal of the relay 57, and this relay is closed when the terminal $h$ is energized, this terminal $h$ being connected directly with the light responsive means 16 in FIG. 1 and not requiring a driver circuit as shown in FIG. 3 since it is only a simple on-off response which is required.

The numeral "1" is decoded when the segments A and B in are emitting light, so that the relays in the column A and B in FIG. 5 are reversed. In this position, the relays 40 and 41 have their contacts opened, whereas the relays 50 and 51 have their contacts closed. In this position, only the output 32 represented by the numeral "1" in the rectangular box near the center of FIG. 5 is energized by current passing from the battery 60 through the closed contacts of relays 50 and 51, through the closed contacts of the relay 42, and through the bottom closed contacts of the relay 43. The other rectangular boxes 32 are not energized in this position.

The numeral "2" is activated so as to activate the wire leding to the rectangular box 32 containing the numeral "2" when the relays located in columns A, C, D, E, and G are closed. In this position of the relays, current flows from the battery 60 through the closed contacts of the relay 50, and flows through the still closed contacts of the relay 41 to the rectangular terminal labelled "2." With the relays in the position aforementioned, it will be noted that an effort to trace any of the other outputs 32 back to the battery will always fail because of an open switch in the path.

The numeral "3" is energized when the segments A, B, C, D, and E are activated. In this position of the relays in which the relays F and G remain as shown in the drawings and the relays A, B, C, D, and E are reversed, current flows from the battery 60 through the closed contacts of the relays 50 and 51 and through the upper closed contacts of the relays 52, 53, and 54, and through the still closed contacts of the relay 45 to the output 32 labelled "3" in the rectangular box. The other outputs 0 though 9 are not connected to the battery since each of them encounter an open contact before reaching the battery.

The output 32 labelled "4" is activated when the segments A, B, D, and F are energized, the current flowing from the battery 60 through the closed contacts of the relays 50 and 51 and 42, and through the lower closed contacts of the relay 53. The other outputs 32 aside from the output labelled "4" in the middle of FIG. 5 are open in this position of the relays A through G inclusive.

The numeral "5" is activated at the outputs 32 when the segments B, C, D, E, and F are energized, whereby the "5" output 32 is energized by connecting the battery through the closed contacts of the relay 40, the lower contacts of the relay 52, and the upper contacts of the relay 46. The other outputs 32 are each separated from the battery 60 by at least one open contact.

The numeral "6" among the outputs 32 is energized when the segments B, C, D, E, F, and G are energized, the "6" output 32 being energized from the battery via the closed contacts of the relay 40, the lower contacts of the relay 52, and the lower contacts of the relay 56. The other outputs 32 are de-energized in these positions of the relays.

The numeral "7" is energized when the segments A, B, and C are energized, the output "7" being energized from the battery via the closed contacts of the relays 50, 51, 52, and 44 and by the upper closed contacts of the relay 43. All other outputs 32 are de-energized in this position of the relays.

The output "8" is energized when all of the segments A through G inclusive are energized. In this position the output "8" is energized through the upper terminals of the relays C, D, E, and G and through the closed terminals of the relays A, B, and F. In this position of the relay all of the other outputs 32 are de-energized.

The numeral "9" is energized when the segments A, B, C, D, E, and F are energized, and in this position the battery delivers energy to the output 32 in the "9" position through the closed contacts of the relays A, B, and F and through the upper closed contacts of the relays C, D, and E, and through the lower closed contacts of the relay 46.

Finally, the "0" output 32 is energized whenever the segments A, B, C, E, F, and G are energized, whereby current is delivered from the battery through the closed contacts of the relays 50 and 51 and through the upper closed contacts of the relays 52 and 43, and through the lower closed contacts of the relay 54. All of the other outputs "1" through "9" are de-energized by open contacts of the relays.

Referring now to FIG. 4, the Braille presentation 38 includes five solenoid actuators of which the actuator shown in FIG. 4 is typical, each actuating a dot or a bar. A typical presentation component is shown in FIG. 4 in cross-section and includes a pattern plate 62, a supporting box 64, a dot or bar member 66 and a toggle arrangement for raising or lowering the dot or bar member 66 including a toggle linkage 67 and 68, joined at a pivot pin 69. The pivot pin 69 is also connected to an actuator rod 70 which extends through the box 64 and is connected at a pivot 72 with a magnetic core 74 extending into an actuator winding 76. A spring 78 is compressed between the left end of the actuator rod 70 and the side of the box 64, the spring 78 normally breaking the toggle and maintaining the dot or bar member 66 in lowered position as shown in dotted lines labelled 66'. In this dotted position, the core is in the position also shown in dotted lines and labelled 74'. When the winding is energized by an appropriate signal, the core is drawn in the rightward direction into the solenoid, compressing the spring, and straightening the toggle 67 and 68 to the position shown in full lines wherein the dot or bar member 66 is raised above the pattern plate 62 and into a position for tactile sensing by the blind person operating the converter.

The five solenoid actuating windings corresponding with the winding 76 in FIG. 4 are shown in FIG. 5 and labelled 71, 73, 75, 77, and 79, the latter representing the decimal point and actuating the bar shown in the presentation as viewed in FIG. 1.

The diode circuit corresponding with the box labelled 34 in FIG. 1 comprises an arrangement of diodes shown in a row in the lower portion of FIG. 5. By tracing the circuit from each of the outputs 32 which are labelled "1" through "9" and "0" it can be seen that the solenoid windings associated with the dots which are labelled 71, 73, 75 and 77 in FIG. 5 are energized to raise selected dots of the display to provide the same pattern of raised dots as is illustrated by black dots in FIG. 2. For instance, the diode 81 is connected through a driver amplifier 82 to actuate the solenoid winding associated with the dot 71 to raise the upper left-hand dot to represent the numeral "1" in FIG. 2. Likewise, when the output 32 for the numeral "2" is energized, the diodes, 83 and 84 will both be energized so as to energize the amplifiers 82 and 85, and thereby activate the solenoid windings associated with the dots 71 and 75 to produce the dot pattern representative of the numeral "2" as shown in FIG. 2. Likewise, it can be seen that activating any of the other outputs 32 will energize other combinations of the dots 71, 73, 75 and 77. For instance, if the output "7" is activated the diodes 90, 91, 92, and 93 will all pass current to energize all four of the dot solenoids through the amplifiers 82, 85, 86 and 87 to produce the pattern for the numeral "7" in FIG. 2 in which all four dots are raised.

The amplifier 88 is provided to energize the solenoid winding for the bar 79 representing the decimal point in the Braille presentation. It is to be understood that the amplifiers 82, 85, 86, 87 and 88 are merely illustrated to show a practical system providing sufficient energy to operate the actuator windings. However, if high-current diodes are used together with heavy duty terminals for the relays 40 through 46 and 50 through 57, amplifiers will be unnecessary since the solenoid actuators can derive their power directly therethrough from the battery 60.

The present invention is not to be limited to the exact form shown in the drawings, for obviously changes may be made therein within the scope of the following claims.

I claim:

1. A converter for reading displays having a predetermined arrangement of light emitting segments for representing alpha-numeric characters and delivering a Braille pattern of raised dot and/or bar members readable by a blind person as a tactile presentation, comprising:
   a. reading head means having multiple light-responsive means each corresponding with a different one of said segments and respectively disposed to face toward and respond to one associated character segment when emitting light, whereby said reading head means determines which of said segments are illuminated;
   b. electric decoder means having multiple inputs respectively coupled with said multiple light responsive means, and having outputs responsive to said inputs and representing when activated decoded alpha-numeric characters;
   c. Braille means including a pattern with raiseable tactile members, and actuator means each connected to one of said members and operative when energized to raise the associated member in the pattern; and
   d. electrical circuit means connected to the outputs of the decoder means and to said individual actuator means, and operative in response to activation of said outputs representing characters to energize appropriate actuator means to present in said pattern Braille presentations of the same characters.

2. A converter as set forth in claim 1, wherein said reading head comprises said light responsive means each located to intercept light from a different character segment, and barrier means extending between said light responsive means and disposed to restrict each light responsive means to accepting light from only one segment.

3. A converter as set forth in claim 1, wherein said decoder means comprises a source of power; an output corresponding with each character which will be represented by said segments; multi-path switching means connected between said power source and said outputs, the switching means each being switchable between a conductive and a non-conductive condition and said decoder inputs being coupled to the switching means to control the conductive condition of each and thereby determine which ones of said multi-paths are conductive.

4. A converter as set forth in claim 1, wherein said decoder means comprises a source of power; an output corresponding with each charactter which will be represented by said segments; multiple relay means, each having a winding connected to be energized by one of said inputs and said relays having contacts connected with said power source and with said outputs and forming multiple different paths therebetween depending upon which of the relay windings are energized.

5. A converter as set forth in claim 1, wherein said Braille means comprises a board having a pattern of holes therein; a tactile member at each hole having a raised position in which it extends through a hole above the board, and having a retracted position; said actuator means comprising a solenoid coupled to each tactile means and operative when energized to raise the member, and spring means coupled with each member and operative to urge it toward retracted position.

6. A converter as set forth in claim 1, wherein each output of said decoder means represents a different alpha-numeric character which will be represented by said segments; and said electrical circuit means comprising diode means connecting each of said decoder outputs with selected actuator means, whereby when an output is activated to represent a character said diode means will energize those actuator means which are appropriate to present the same character in a Braille pattern of raised tactile members.

* * * * *